Figure 1:
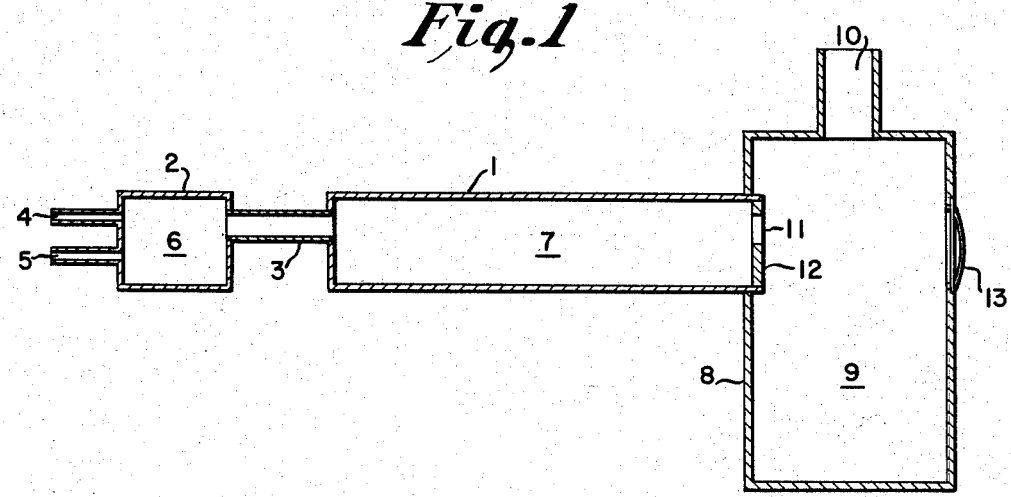

INVENTORS
IGNACE J. KRCHMA
CARL MARCUS OLSON

BY *Francis J. Crowley*

ATTORNEY

2,883,269

PRODUCTION OF ELEMENTAL SILICON

Ignace J. Krchma, Wilmington, and Carl Marcus Olson, Newark, Del., assignors to E. I. du Pont de Nemours and Company, Wilmington, Del., a corporation of Delaware Application September 22, 1955, Serial No. 535,934

9 Claims. (Cl. 23—223.5)

This invention relates to the preparation of elemental silicon of improved purity.

Silicon can be prepared in a relatively pure state by the vapor phase reduction of a high purity silicon chloride with a high purity, commercial grade of zinc. However, the silicon product deposited within the reaction zone will contain some trace impurities which are introduced by the reactants even though they are of the highest available quality. For the most sensitive electronic uses, it would be desirable to have silicon which is completely free of even trace impurities since their presence proves detrimental to the semiconductor properties of the element.

It is among the objects of this invention to provide an improved process for producing hyperpure elemental silicon by means of the vapor phase reduction of a relatively pure silicon halide with a vaporized elemental reductant, such as zinc or cadmium. A further object is to produce hyperpure elemental silicon that is substantially free of the trace amounts of impurities which affect its semiconductor properties. Other objects will be evident from the ensuing description.

These and other objects of the invention are accomplished by passing a high purity silicon halide vapor and a high purity vapor of a reducing metal, such as zinc or cadmium, through a reaction zone whereupon a partial reaction takes place as the vapors are passing through; said reaction will cause the deposition of silicon and most of the trace impurities of the reactants in this reaction zone; the vaporous by-products and the unreacted, purified silicon halide and metal vapors from the reaction zone are then passed into another reaction zone where the reduction and deposition of silicon is continued, and the by-products pass from the zone in the vapor state. Upon cooling the reaction zones and separately recovering the silicon in the different reaction zones, it is possible to obtain from the second, or main reaction zone, a silicon product which is substantially free of the trace impurities contained in the starting materials.

For the purposes of convenience in describing the invention, the zone where the partial reaction of silicon chloride and substantially complete deposition of impurities takes place is designated as the prereaction zone. This zone may be unitary as shown by reference character 6 in Figure 1, or it may be divided as shown by reference characters 19 and 20 in Figure 2. The temperatures in the reaction zones must be above the boiling point of the reducing metal so as to have all the reactants in the vapor state. The upper temperature limit, of course, should be below the boiling point of silicon in order to have deposition take place. For practical purposes in regard to suitable apparatus, an upper limit of 1100° C. is satisfactory. The temperatures in the reaction zones may be the same, or they may vary within the reaction limits. However, the deposition of impurities is favored by maintaining the prereaction zone 25–100° C. higher than the main reaction zone with a temperature differential of 25–50° C. being preferred.

In one embodiment, this invention comprises introducing silicon halide vapor; e.g., silicon tetrachloride vapor, and elemental zinc or cadmium in the vapor state into an apparatus having two connecting reaction zones—one being the prereaction zone and the other being the main reaction zone.

As the vapors pass through the prereaction zone, the trace impurities are deposited along with 5–25% of the silicon product. The vaporous by-products of the initial reaction and the unreacted vapors of the metal and the silicon halide then pass into the main reaction zone where the desired silicon product is deposited while the by-products of the reactions are passed off in the vapor state. The silicon which is recovered from the main reatcion zone has excellent semiconductor properties.

In another embodiment, this invention comprises introducing both silicon halide vapor and vaporous zinc or cadmium into a divided prereaction zone having two separate divisions. In one division, the silicon halide is kept in stoichiometric excess of the metal vapor, and in the other the metal is in excess of the halide. As the reactants simultaneously pass through the divisions of the prereaction zone, there are deposited in each division the trace impurities of the initial reactants and some silicon, the total amount of silicon for the two divisions being about 5–25% of the silicon deposited during the process. The vaporous by-products of the initial reaction and the unreacted vapors of the metal and the silicon halide from both divisions then pass into a single main reaction zone where the reaction proceeds in the same manner as described in the preceding paragraph.

Referring to the drawing of Figure 1 there is shown a suitable apparatus, preferably constructed of fused silica or other desired corrosion-resistant material. The joints and connections are adapted to avoid influx of contaminating atmosphere, and they are preferably welded or fused. This zonal reactor is comprised of the main reactor 1, the prereactor 2 and conduit 3 which are maintained at temperatures at least above the boiling point of the reductant metal (zinc or cadmium) and below about 1100° C., and said reactor can be positioned within a furnace suitable for zonal temperature control. Such furnaces are known and do not constitute a part of this invention. After preheating the entire reactor to 920–950° C. and thoroughly purging with an inert gas such as nitrogen or argon, highly purified, silicon tetrachloride vapor and zinc vapor, preheated to a temperature close to the prereaction zone temperature in communicating silica equipment, are passed into the prereaction zone 6 through the inlet jets 4 and 5 respectively. In the prereaction zone 6, temperature and reactant through-put relationships are maintained to provide for the deposition of about 5–25% of the reaction product silicon along with substantially all the trace impurities in the reactants, while the mixed unreacted reactants and reaction by-products pass through conduit 3 into the main reaction zone 7 for deposition of the remainder of the silicon. By virtue of the deposition of the trace impurities in purification zone 6, the silicon deposited in the main reaction zone 7 is purer, higher in resistivity and lifetime characteristics than that deposited in the purification zone 6. (Lifetime is discussed in "Electrons and Holes in Semiconductors," by Shockley, and in "Physical Review," vol. 90, p. 152, 1953.) Because of these improved properties it is much more suitable for the most critical semiconductor uses, such as transistors and rectifiers. The removable plug 12 is made of silica and contains an opening 11 for removal of unreacted reactants and by-product vapors into the solids condenser 8, where by-product zinc chloride and unreacted zinc are deposited. Opening 10 provides for the disposal of unreacted silicon tetrachloride which may be recovered in communicating equipment. The product silicon from the main reactor zone 7 is allowed to cool, and it is then removed by raking out the product, access being obtained through the removable cap 13 and plug 12.

Figure 2:
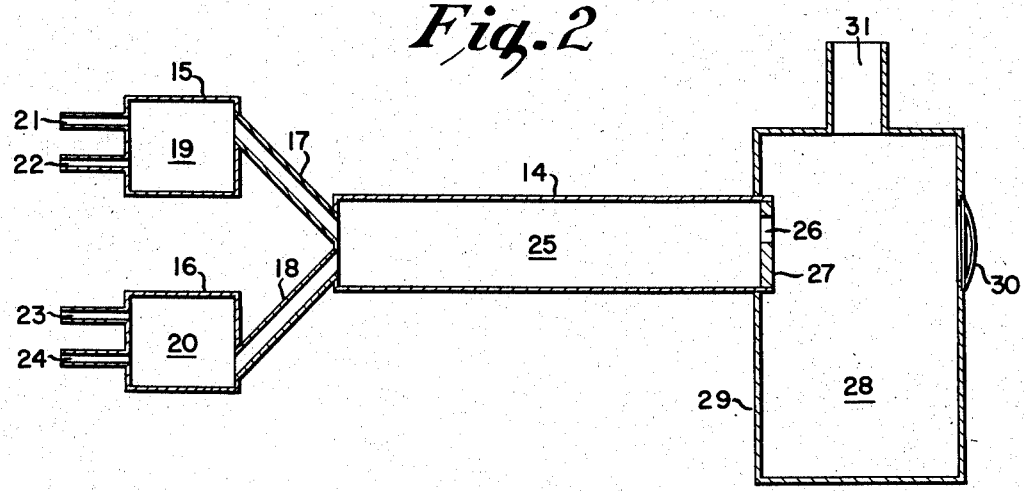

Referring to the drawing of Figure 2, another practical adaptation of the invention, there is shown a suitable apparatus preferably made of fused silica and connected by welded joints. This zonal reactor is comprised of the main reactor 14, a two-part prereaction reactor 15 and 16 and conduits 17 and 18, which are maintained at temperatures at least above the boiling point of the elemental reductant metal (zinc or cadmium) and below about 1100° C., and they are positioned within a furnace which is suitable for zonal temperature control. Highly purified and preheated silicon tetrachloride vapor and zinc vapor, preheated to a temperature close to prereaction zone temperatures in associated silica equipment are passed into the two-part prereaction zone 19 and 20 through the inlet jets 21 and 23, and 22 and 24 respectively after thoroughly purging the entire apparatus with an inert gas and preheating to 920–950° C.

The feed to part 15 is regulated so that the silicon tetrachloride vapor is in a large stoichiometric excess, while in the parallel part 16 the proportions are reversed so that the zinc vapor is in excess. In each division of the prereaction zone 19 and 20 some silicon is deposited as the result of the reduction of the silicon tetrachloride by the zinc; the total amount deposited in both divisions being regulated so that it is within the range of about 5–25% of the total silicon deposited in both the two-part prereaction zone 19 and 20 and the main reaction zone 25. Deposition is regulated to obtain amounts of silicon of about the same order of magnitude in each division of the prereaction zone 19 and 20. The reaction by-product, zinc chloride vapor, and the unreacted silicon tetrachloride vapor and elemental zinc vapor from the two-part prereactor are passed into the main reaction zone 25 through the conduits 17 and 18 for immediate reaction, and the deposition of the purest silicon is obtained in zone 25, due to the fact that trace impurities carried into the apparatus in the reactants are deposited in the two-part prereaction zone 19 and 20. Such impurities include aluminum, carbon, phosphorous, sulfur, arsenic and antimony. The by-products and the unreacted material are recovered in the same manner as previously described for Figure 1. Parts 26—31 in Figure 2 are the same as parts 8—13 of Figure 1. The contents of the divided prereaction zone are removed when the divisions become almost filled with silicon. By having each division of the prereaction zone 19 and 20 of a size equivalent to about one-tenth to one-quarter the volume of the main reaction zone 25, it is possible to fill the main reaction zone 25 three or four times before it is necessary to disengage the parts 15 and 16 and remove the silicon deposited therein. The silicon product is removed from the main reactor 25 after it has become almost filled with the product. To remove the silicon, the feed of elemental zinc is discontinued and the reactor is cooled. Care is taken to keep the entire system out of contact with the atmosphere by purging with an inert gas during cooling. The pure silicon product produced in the main reactor zone 25 is suitable for making the most sensitive and critical semiconductors, such as transistors, rectifiers, and the like.

To a clearer understanding of the invention, the following specific examples are given. These examples are for purposes of illustration, and they are not to be construed as limiting the invention.

*Example I*

A zonal reactor system as shown in Figure 1 is employed. Silicon tetrachloride vapor (previously purified by the following treatments: $H_2SO_4$ contact; pyrolysis over $SiO_2$ followed by distillation; and passage over a scavenging bed of silicon at a temperature above the reaction temperature) is introduced into the prereaction section of the zonal reactor. Simultaneously high purity zinc (which has been distilled, fractionated, and passed over a scavenging bed of silicon at a temperature above the boiling point of zinc) is introduced. The purified streams of silicon tetrachloride and zinc are passed simultaneously and continuously during the reaction into inlets 4 and 5 of prereaction chamber 2 from associated purification apparatus not shown. The zonal reactor is constructed of fused silica. The reaction zones are made of cylindrical silica tubing about 10 inches in diameter. The purification zone is about one foot long; the main reactor zone is about ten feet long; and the two zones are in open communication. The entire zonal reactor is preheated to the range of 920–950° C., while passing argon gas through the reaction system and the separate reactant purification systems (not shown) to free the entire purification and reaction systems of moisture, oxygen and other atmospheric contaminants. The exit gas from the main reaction zone is passed into the solids condenser 8 and then to a silicon tetrachloride condenser (not shown). The temperatures of the process are as follows:

|   | Degrees centigrade |
|---|---|
| (1) Silicon tetrachloride vapor entering | 950 |
| (2) Zinc vapor, entering | 925 |
| (3) Prereaction zone temperature | 975 |
| (4) Main reaction zone | 940–950 |

A flow rate to the prereaction zone of about 5.2 lbs. of zinc per hour is started and maintained. After a few minutes a simultaneous silicon tetrachloride flow is started and maintained at about 8.2 lbs. per hour. Both flows are maintained for a period of about 60 hours, the zinc flow being cut off a short time (less than an hour) before stopping the silicon tetrachloride vapor flow. Argon is passed through the entire reactor during cooling. About 40 pounds of silicon of very high purity and of high semiconductor quality is deposited in the main reaction zone. After cooling, it is removed by means of a scraper. About four pounds of silicon of lower purity and semiconductor quality is deposited in the prereaction section of the reactor.

*Example II*

The reactant purification system and the overall feed rates as described in Example I are employed. The zonal reactor system is shown in Figure 2. Separate streams of silicon tetrachloride vapor and zinc vapor are passed into the preheated and inert gas-purged, zonal reaction system comprising a two-part prereaction zone and a main reaction zone as shown. The weight ratio of silicon tetrachloride vapor to zinc vapor entering one of the prereaction divisions is maintained at approximately 2:1, while the remaining silicon tetrachloride vapor and zinc vapor are allowed to pass into the other division. The vaporous products from the divided prereactor then pass simultaneously into the main reaction zone. During the entire run of about ninety hours, the flow of reactants is continuously maintained as stated, the zinc vapor feed being started first and turned off first. The following temperature conditions are maintained throughout the run:

|   | Temp., °C. | Weight Silicon Deposited |
|---|---|---|
| (1) Preheat temp. of entire reactor system | 925 |   |
| (2) Prereactor zone (2:1, $SiCl_4$:Zn) | 975 | 5 lbs. |
| (3) Prereactor zone (remainder of reactants) | 925 | 2 lbs. |
| (4) Main reactor zone | 950 | 60 lbs. |
| (5) Overall rate of feed $SiCl_4$ | 8.2 pounds per hr. |   |
| (6) Overall rate of feed Zn | 5.2 pounds per hr. |   |

After cooling the reactor system under an inert gas purge, the product silicon from the main reactor is removed. The silicon deposited within the two-part prereaction zone is allowed to remain untouched, until the prereaction zone becomes filled with silicon in subsequent runs. The product silicon from the main reactor is of very high purity and has high resistivity and lifetime characteristics when fabricated as a semiconductor material.

Example III

The reactant purification system and the zonal reactor system described in Example II are employed. Silicon tetrachloride vapor and zinc vapor are fed into the two-part prereactor in weight ratios of 14.2 to 1, and 1 to 5.7, respectively, and the unreacted reactants and zinc chloride are passed into the main reaction zone for final reaction. Temperatures, conditions of operation, and depositions of silicon are as follows:

|  | Temp., °C. | Weight Silicon Deposited |
|---|---|---|
| (1) Preheat temperature of entire reactor system | 940 |  |
| (2) Prereactor zone (14.2:1, SiCl$_4$:Zn) | 950 | 10 lbs. |
| (3) Prereactor zone (1:5.7, SiCl$_4$:Zn) | 1,000 | 4 lbs. |
| (4) Main reactor zone | 960 | 50 lbs. |
| (5) Overall rate of feed, SiCl$_4$ | 8.2 pounds per hr. | |
| (6) Overall rate of feed, Zn | 5.2 pounds per hr. | |
| (7) Time of reaction | 75 hrs. | |

The silicon product is removed from all reaction zones and separately examined for semiconductor utility with findings as follows:

|  | Appearance | Resistivity | Lifetime |
|---|---|---|---|
| (1) Prereactor (14.2:1, SiCl$_4$:Zn). | Silvery needles. | High. | High. |
| (2) Prereactor (1:5.7, SiCl$_4$:Zn). | Some yellow plates and silvery needles. | Sl. higher than (1). | =to (1). |
| (3) Main reaction zone. | Silvery needles. | Very much higher than (1). | Very much higher than (1). |

Example IV

A reactor system similar to that described in Example I is employed, except that the two zones, the prereaction and the main reaction zones, are contained within the same chamber. Silicon tetrachloride and zinc are fed into the prereaction zone after prepurification of the reactants in associated silica equipment. The conditions of temperature and amounts of silicon deposited within the zones are as follows:

|  | Temp., °C. | Weight of Silicon Deposited |
|---|---|---|
| (1) Preheat temperature | 920 |  |
| (2) Prereaction zone | 950 | 10 lbs. |
| (3) Main reaction zone | 920 | 30 lbs. |
| (4) Rate of silicon tetrachloride feed | 8.2 pounds per hr. | |
| (5) Rate of zinc feed | 5.2 pounds per hr. | |
| (6) Total reaction time | 40 hrs. | |

The silicon product separately recovered in the main reaction zone is more silvery in appearance, composed of more loosely held together particles, and higher in resistivity and lifetime than the silicon deposited within the prereaction zone at the front of the chamber.

Example V

Employing a system and mode of operation as described in Example III, cadmium is used as the reductant metal vapor. The temperatures, conditions of operation, and depositions are as follows:

|  | Temp., °C. | Weight of Silicon Deposited |
|---|---|---|
| (1) Preheat temp. of entire reaction system | 900 |  |
| (2) Prereactor zone (5:1, SiCl$_4$:Cd) | 960 | 8 lbs. |
| (3) Prereactor zone (Remainder of reactants) | 1,010 | 6 lbs. |
| (4) Main reaction zone | 970 | 60 lbs. |
| (5) Overall rate of feed, SiCl$_4$ | 8.2 pounds per hr. | |
| (6) Overall rate of feed, Cd | 9 pounds per hr. | |
| (7) Time of reaction | 90 hours. | |

The product silicon obtained in the main reactor zone is of high semiconductor quality.

The amounts of impurities dealt with in this invention are so minute that analytical determination of such impurities is dependable only to a degree; however, in some cases impurity concentrations are high enough for spectroscopic or highly specialized analytical techniques. In general, the only reliable method for determination of semiconductor quality is by actual manufacture of test samples of such semiconductor materials. The silicon is drawn into single crystal form, and dependable measurement of resistivity and lifetime can be made. In this way, its suitability for use in semiconductor devices such as transistors or rectifiers can be determined. By such determinations it is found that the silicon product deposited in the main reaction zone of this invention is the most satisfactory material for semiconductor uses now known. As resistivity and lifetime measurements reflect freedom from impurities, it is therefore seen that trace impurities are thus eliminated from the main product to a greater degree than is possible by previously described methods.

Silicon chloride used for feeding the reactor is of the highest purity commercial C.P. silicon tetrachloride available, and it may be subjected to one or more of such repurification treatments as simple redistillation, fractionation, water treatment, sulfuric acid treatment, vapor phase removal of carbon-containing compounds by pyrolysis, and scavenging by passing over highly heated silicon of high purity. The zinc or cadmium reactant also is of the highest purity commercially available, and also it may be repurified by subjecting it to one or more treatments; such as redistillation, fractionation, electrolysis, and scavenging by passing over silicon of high purity. Before entering the reactor the silicon chloride and metal reductants are preheated to insure entrance into the first reaction zone at a temperature above the boiling point of the reductant metal. For zinc this would mean about 907° C. and for cadmium about 767° C.

The total rate of flow of the silicon halide and metal reductant to the reactor is based on the stoichiometric relationship between the silicon halide and the preferred reductant metal in the reaction which produces elemental silicon. For the preferred reactants, silicon tetrachloride and zinc, this would be $$SiCl_4 + 2Zn \rightarrow 2ZnCl + Si$$

A slight excess (about 5 to 10% by weight) of silicon chloride vapor over zinc is preferred; however, if desired, an excess or deficiency on the order of 50% can be used. Reacting proportions beyond this range are operable to some extent, but yields are low. In the embodiment of the invention wherein the total silicon chloride and total zinc vapor are divided for prereaction in a two-part prereaction zone, the excess or deficiency of silicon chloride therein may vary more widely. Thus, when an excess of silicon tetrachloride is maintained in one division, a corresponding deficiency is maintained in the other. The excess or deficiency in these divisions may be as high as 700–1100%, while the combined reaction streams within the main reactor will be maintained within the limit noted above.

While silicon tetrachloride is the most economical and readily available of the silicon halides, the invention is not restricted thereto. Other chlorides and halides such as di-silicon hexachloride, silicon tetrabromide, di-silicon hexabromide, silicon tetraiodide and the like may be used in this invention.

If desired, an inert carrier gas, such as nitrogen, or one of the inert gases such as argon, can be used for purposes of assisting in carrying the silicon chloride vapor or vaporized reductant metal through one or more of the reaction zones.

While it is sufficient to react and deposit from about 5–25% of the total silicon product in the preparation zone, the deposition of amounts outside of this range is also contemplated. Control of this deposition can be regulated through variation in the feed rate, temperatures, the configuration of the reaction zone and the relative reactant concentrations.

An advantage of this invention is that it produces a very high purity silicon, by a convenient process which requires a minimum of additional apparatus. At the same time, the process produces additional separable small amounts of elemental silicon which is of sufficient purity to have commercial use as a semiconductor where higher resistivity and longer lifetime are not critical.

We claim:
1. A process for the manufacture of elemental silicon of improved purity which comprises passing through a first reaction zone the vapors of a silicon halide containing trace impurities and the vapors of a reducing metal containing trace impurities, said metal being selected from the group consisting of zinc and cadmium, reacting a portion of the passing vapors and thereby depositing a portion of the silicon and substantially all of the trace impurities within said first reaction zone, passing the vaporous by-products of the reaction and the unreacted vapors of said silicon halide and said reducing metal into a second reaction zone, reacting said vapors of silicon halide and the metal in said second reaction zone thereby depositing silicon of improved purity within said second zone, and recovering the purer product in said second reaction zone separately from the product of lesser purity in the first reaction zone.

2. The process of claim 1 in which the silicon halide vapor is silicon tetrachloride vapor, and the reducing metal vapor is zinc.

3. A process for the manufacture of elemental silicon of improved purity which comprises passing through a unitary first reaction zone the vapors of a silicon halide containing trace impurities and the vapors of a reducing metal containing trace impurities, said metal being selected from the group consisting of zinc and cadmium, reacting a portion of the passing vapors and thereby depositing a portion of the silicon and substantially all of the trace impurities within said first reaction zone, passing the vaporous by-products of the reaction and the unreacted vapors of said silicon halide and said reducing metal into a second reaction zone, reacting said vapors of silicon halide and the metal in said second reaction zone thereby depositing a silicon of improved purity within said second zone, and recovering the purer product in said second reaction zone separately from the product of lesser purity in the first reaction zone.

4. The process of claim 3 in which the silicon halide vapor is silicon tetrachloride vapor, and the reducing metal vapor is zinc.

5. A process for the manufacture of elemental silicon of improved purity which comprises passing through a divided first reaction zone the vapors of a silicon halide containing trace impurities and the vapors of a reducing metal containing trace impurities, said metal being selected from the group consisting of zinc and cadmium, a portion of said metal vapors being passed through one division of said first reaction zone with an excess of silicon halide while the remainder of said vapors with the zinc in excess are passed through the other division, simultaneously reacting a portion of the passing vapors in each division of said first reaction zone thereby depositing a portion of the silicon and substantially all of the trace impurities within said divided first reaction zone, then simultaneously passing the vaporous by-products of the reactions and the unreacted vapors of said silicon halide and said metal into a second reaction zone, reacting said vapors of silicon halide and metal in said second reaction zone thereby depositing a silicon of improved purity within said second zone, and recovering the purer product in said second reaction zone separately from the product of lesser purity in the first reaction zone.

6. The process of claim 5 in which the silicon halide vapor is silicon tetrachloride vapor, and the reducing metal vapor is zinc.

7. A process for the manufacture of elemental silicon of improved purity which comprises passing through a first reaction zone the vapors of a silicon halide containing trace impurities and the vapors of a reducing metal containing trace impurities, said metal being selected from the group consisting of zinc and cadmium, reacting a sufficient portion of the passing vapors to deposit within said first reaction zone from about 5 to 25% of the total silicon which is to be deposited in said process along with substantially all the trace impurities, passing the vaporous by-products of the reaction and the unreacted vapors of the said silicon halide and said reducing metal into a second reaction zone, reacting said vapors of the silicon halide and the metal in said second reaction zone thereby depositing a silicon of improved purity within said second zone, and recovering the purer product in said second reaction zone separately from the product of lesser purity in the first reaction zone.

8. The process of claim 7 in which the silicon halide vapor is silicon tetrachloride vapor, and the reducing metal vapor is zinc.

9. The process of claim 7 in which the silicon halide vapor is silicon tetrachloride vapor, and the reducing metal vapor is cadmium.

References Cited in the file of this patent
UNITED STATES PATENTS
2,773,745    Butler _____ Dec. 11, 1956

OTHER REFERENCES
Lyon et al.: "J. of Electrochemical Society," vol. 96, No. 6, December 1949, pp. 359–363.

UNITED STATES PATENT OFFICE
CERTIFICATE OF CORRECTION

Patent No. 2,883,269                                               April 21, 1959

Ignace J. Krchma, et al

It is hereby certified that error appears in the printed specification of the above numbered patent requiring correction and that the said Letters Patent should read as corrected below.

Column 2, line 15, for "reatcion" read — reaction —; column 5, lines 42 and 43, Example 3, second table, first column thereof, for "Sicl$_4$:Zn)." read — SiCl$_4$:Zn). —; column 6, line 65, the formula should read as shown below instead of as in the patent:

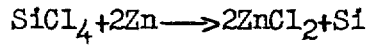

$$SiCl_4 + 2Zn \longrightarrow 2ZnCl_2 + Si$$

Signed and sealed this 8th day of September 1959.

(SEAL)
Attest:

KARL H. AXLINE                                                   ROBERT C. WATSON
Attesting Officer                                             Commissioner of Patents